United States Patent Office 2,819,192
Patented Jan. 7, 1958

2,819,192
MODIFICATION OF ALUMINUM SURFACES

James H. Young, Niagara Falls, N. Y., assignor to E. I. du Pont de Nemours and Company, Wilmington, Del., a corporation of Delaware No Drawing. Application December 23, 1955
Serial No. 554,918

10 Claims. (Cl. 148—6.14)

This invention relates to the modification of aluminum surfaces and more particularly to an improved process for the production of adherent oxide films on aluminum.

Oxide films on aluminum afford chemical protection and serve as a base for paints, dyes or pigments. While exposure to air and moisture forms such oxide coatings, they are thin and lack protective power and anchoring capacity. Protective oxide films are usually produced commercially by the well known process of anodizing. In this process, the aluminum is made the anode in an electrolytic acid bath. However, electrolytic treatments are expensive and not well adapted for use on fabricated articles. Chemical treatments of aluminum are also well known in the art. Of these, treatment with solutions containing chromates are important. The latter give colored films that are most serviceable for protecting aluminum when appearance is of no importance or producing a base for a pigmented paint or enamel. These films are not generally dye absorbent.

The present invention provides an inexpensive method for producing colorless absorbent and protective oxide films on aluminum involving treatment of the aluminum surface with a solution containing hydrogen peroxide maintained at an alkaline pH of approximately 11.

In the past, aluminum surfaces have been treated with acid solutions of hydrogen peroxide for the purpose of cleaning and brightening the surface or cleaning and abrading it to receive certain coating materials. Aqueous solutions of hydrogen peroxide and phosphoric acid have been used for this purpose, as well as solutions of hydrogen peroxide and ammonium persulfate. The latter solutions have pH values ranging from approximately 0 to 1 and etch the aluminum surface. It has also been known that small concentrations of hydrogen peroxide in dilute caustic alkalies will prevent corrosion of aluminum by these agents as long as the protective concentration of peroxide is maintained. Strongly alkaline solutions of sodium perborate in trisodium phosphate containing other agents have also been employed to protect aluminum from corrosion during alkaline cleansing.

The object of the present invention is to provide an improved method for producing colorless, absorbent and protective oxide films on aluminum.

Another object is to provide a simple chemical method for producing an absorbent oxide film on aluminum capable of receiving dyes or protective organic coatings.

A further object is the provision of absorbent oxide coatings on aluminum which can be readily rendered nonabsorbent and protective.

These and other objects will be more apparent and the invetion will be more readily understood from the following description.

The objectives of this invention are carried out by treating a clean, oxide-free aluminum surface with a solution of hydrogen peroxide containing a buffer which has been adjusted to a pH of approximately 11.

The preferred procedure of this invention yields an absorbent oxide film which is rendered nonabsorbent and protective by treating with water at an elevated temperature, viz. steam or boiling water. Alternatively, the film is gradually rendered nonabsorbent by ageing.

The peroxide solution employed may contain from 0.1 to 1% by weight of hydrogen peroxide. The preferred concentrations range from about 0.2 to 0.4%. The buffer employed in this solution may consist of any recognized alkaline buffer salt such as the sodium salts: borax, sodium metaborate, sodium orthophosphate, sodium pyrophosphate, sodium carbonates, sodium silicate, etc. In general, the borate and phosphate buffers are preferred since they give smooth, absorptive, colorless films. Carbonates and siilcates do not yield a highly absorbent film and tend to produce colorations, this is particularly true in the case of silicate buffers. The preferred concentration of the buffer salt is 0.5 to 2% by weight although higher concentrations may be used. The pH of the treating solution should be adjusted to approximately 11 by use of a caustic alkali. Adjustment should be made with care since solutions having pH values of less than 10.5 and greater than 11.5 do not produce satisfactory results. The best results are obtained at approximately pH 11.0. A temperature in the range 20°–50° C. may be employed for the treatment. However, the preferred range is about 25°–40° C. If the solution is much above 40° C. a nonabsorbent film results. The time should be 15 to 30 minutes at low salt and peroxide concentrations and can be reduced to 2–10 minutes at higher levels.

Since the adjusted peroxide solutions obtained with borax and sodium metaborate are the equivalent of solutions prepared with sodium perborate, the latter agent may be used in place of hydrogen peroxide and the borate buffer provided it is also adjusted to the proper pH value. Alternatively, similar results can be obtained with sodium peroxide and borax. Any combination of an inorganic peroxygen compound, salt and base which will give a solution having an available peroxide content as determined by analysis, buffer content and pH within the range of the aforesaid treating solution will serve for the purposes of this invention.

If the metal surface is to be dyed or subjected to another surface treating agent this should be done soon after the treatment and to wet samples. To obtain good chemical resistance the absorbent film must be heated in boiling water or steam to seal the surface. A dyed film can be made more permanent by heating or other conventional after-treatments. In lieu of this, aging at room temperature will eventually produce film closure and an increase in resistance. The aging process requires approximately 1 or 2 weeks at room temperature.

The invention is further illustrated by the following examples:

EXAMPLE 1

This example illustrates the method of treating aluminum with a sodium perborate solution to obtain the oxide film of this invention.

Several 3 x 5 in. strips of $3/16$ in. thick aluminum sheets were cleaned of grease and superficial oxide, by immersing in a 5% sodium hydroxide solution at 25–30° C. The treated strips were then thoroughly rinsed in water. Following this, the strips were treated in three 1% solutions of sodium perborate adjusted with sodium hydroxide to pH values of 10.1, 10.5 and 11 respectively. These solutions are chemically equivalent to a 0.4% solution of hydrogen peroxide containing 0.8% sodium metaborate. The treated strips were removed from the perborate, washed in water, rinsed in methanol and dried. They were then weighed. To determine the weight of oxide film, the strips were freed of oxide by immersion in a solution which contained 20 g. of chromic acid and 35 ml. of 85% phosphoric acid in 1000 ml. of water. The strips were heated in this solution for 15 minutes, washed in water, rinsed in methanol and dried. Results shown in Table I below indicate the weight of oxide film in mg./sq. ft. for the aluminum treated in the three solutions of pH indicated. Results obtained for an untreated aluminum control strip are included for purposes of comparison.

Table I

| pH | Weight of Oxide Film/Sq. Ft., mg. |
| --- | --- |
| 10.1 | 41 |
| 10.5 | 62 |
| 11.0 | 94 |
| Control | 2–5 |

EXAMPLE 2

This example illustrates the preparation of dyed aluminum.

Aluminum strips similar to those employed in Example 1 and treated in the same manner were removed from the perborate solution directly after treatment, rinsed with water and, without drying, immersed in solutions containing 0.5 ml. of glacial acetic acid, 500 ml. of distilled water and 1.5 g. dye. Two dye solutions were employed: one containing du Pont Anthraquinone Violet RN and the other containing du Pont Capracyl Red. The strips were immersed in the dye baths for 15 minutes at 30–40° C., removed, washed with water and dried. The quantity of dye absorbed was judged by depth of color and adherence. The latter was estimated by scouring with soap and water, and rubbing with a pencil eraser.

Table II tabulates the pH of the treating solution and the quality of dye absorption. Untreated aluminum absorbed no dye when used as a control in this process.

Table II

| pH | Dye Absorbed |
| --- | --- |
| 10.2 | Light color—even. |
| 10.5 | Medium color—streaks. |
| 11.0 | Dark color—good adherence. |
| 11.5 | Light color—rubs off. |

EXAMPLE 3

This example illustrates the improved corrosion resistance of aluminum carrying the oxide films of this invention.

Several 3 x 5 in. strips of aluminum were treated at a pH of 11.0, as in Example 1. After the treatment the strips were immersed in boiling water for 10 to 15 minutes, removed and then submerged in a corrosive solution of 5% sodium chloride and 0.3% hydrogen peroxide to determine resistance. Table III indicates the loss of weight on corrosion in the sodium chloride-peroxide solution and the appearance of the sample. A sample of untreated aluminum was included as a control for comparison.

Table III

| Exposure Time | Appearance of — | | Weight Loss of Strip, mg. sq. ft. |
| --- | --- | --- | --- |
| | Film | Treating Liquor | |
| 24 hours | White—no pits | Clear | |
| 72 hours | do | do | 58 |
| 120 hours | do | do | 60 |

FOR COMPARISON—UNTREATED ALUMINUM

| 1 hour | Brown—pitted | Cloudy with Al(OH)₃ | 027 |
| --- | --- | --- | --- |

EXAMPLE 4

This example illustrates treating aluminum with a solution of hydrogen peroxide containing a phosphate buffer to produce the oxide film of this invention.

Three 3 x 5 in. strips of 3/16 in. aluminum sheet were pretreated as in Example 1 to remove superficial oxide and grease. They were then immersed for 30 minutes at about 25° C. in 3 solutions containing 1% sodium dihydrogen phosphate and 0.35% hydrogen peroxide adjusted to pH values of 10.5, 11.0 and 11.5 respectively. Directly after this treatment, the strips were rinsed with water and dyed with a solution of du Pont Capracyl Red following the procedure of Example 2. The strip which had been treated at pH 11 absorbed dye to give an even coloration whereas the strips treated at pH 10.5 and pH 11.5 were only lightly colored, the pH 11.5 sample being uneven and streaky. For comparison, strips of aluminum were similarly treated in phosphate solutions containing no hydrogen peroxide. These strips did not absorb dye when exposed to the solution of du Pont Capracyl Red.

An additional sample treated at pH 11.0 was found to carry a film weighing 60 mg. per sq. ft. when this measurement was made by the method of Example 1.

The preceding examples are intended merely to illustrate the invention, since many variations can be employed without deviation from the spirit thereof. The treatment, for example, may be adapted for use by spraying, sponging or painting the solution for the surface treatment of aluminum panneled buildings, airplanes, toy trucks, etc. The film can be sealed by treatment with steam or by aging to afford resistance. The freshly formed film can also be used to absorb polymer coatings such as vinyl resin in solution, or rubber latices.

Having described my invention in detail, I claim:

1. The method of producing an adherent oxide film on a clean, oxide-free aluminum surface comprising exposing said surface to an aqueous solution of hydrogen peroxide having a pH in the range 10.5 to 11.5.

2. The method of claim 1 in which the aqueous peroxide solution contains 0.1 to 1% hydrogen peroxide by analysis and the exposure is carried out for 2 to 30 minutes at 20° to 50° C.

3. The method of claim 2 employing an aqueous solution containing about 1% of sodium perborate adjusted to a pH of approximately 11.0.

4. The method of producing an adherent, protective oxide film on aluminum comprising cleaning and removing the ordinary oxide from an aluminum surface, exposing said surface for 2 to 30 minutes at 20° to 50° C. to an aqueous solution containing 0.1 to 1% of hydrogen peroxide and 0.5 to 5% of an alkaline buffer salt adjusted to a pH in the range 10.5 to 11.5 and subjecting the resultant film to a sealing treatment with water at an elevated temperature.

5. The method of claim 4 in which the exposure to the peroxide treating solution is 15 to 30 minutes at 25° to 40° C. and the said solution contains 0.2 to 0.4% hydrogen peroxide and 1 to 2% of a substance selected from the group consisting of alkali metal borates and phosphates adjusted to a pH of approximately 11.0.

6. The method of producing a colorless, absorbent oxide film on a clean oxide-free aluminum surface comprising exposing said surface to an aqueous solution containing about 0.2 to 0.4% hydrogen peroxide and about 1 to 2% of a substance selected from the group consisting of alkali metal borates and phosphates adjusted to a pH of approximately 11 for 15 to 30 minutes at a temperature of 25° to 40° C.

7. The method of claim 6 in which the buffered treating solution is an aqueous solution of about 1% sodium perborate adjusted to about pH 11.0.

8. The method of dyeing aluminum comprising exposing aluminum carrying the absorbent oxide film produced by the process of claim 6 to an acid solution of a dye.

9. The method of dyeing aluminum comprising exposing aluminum carrying the absorbent oxide film produced by the process of claim 7 to an acid solution of a dye.

10. The method of producing an adherent oxide film on aluminum comprising cleaning and removing the ordinary oxide from an aluminum surface, and exposing said surface for 15 to 30 minutes at about 20 to 50° C. to an aqueous solution containing 0.1 to 1% of hydrogen peroxide and 0.5 to 2% of an alkaline buffer salt adjusted to a pH of approximately 11.0.

References Cited in the file of this patent

UNITED STATES PATENTS

| | | |
|---|---|---|
| 1,383,703 | Elmen | July 5, 1921 |
| 2,018,694 | Wetherbee | Oct. 29, 1935 |
| 2,019,229 | Leahy | Oct. 29, 1935 |
| 2,077,450 | Weisberg et al. | Apr. 20, 1937 |
| 2,137,988 | Hempel | Nov. 22, 1938 |
| 2,268,331 | Crooks | Dec. 30, 1941 |
| 2,276,353 | Thompson | Mar. 17, 1942 |
| 2,458,073 | Hemker et al. | Jan. 4, 1949 |

OTHER REFERENCES

J. W. Mellor: "A Comprehensive Treatise on Inorganic and Theoretical Chemistry" (1924), vol. 5, pages 115–117. Longmans, Green and Co., New York.